United States Patent
Gopal et al.

(10) Patent No.: US 10,296,467 B2
(45) Date of Patent: May 21, 2019

(54) SECURING WRITES TO MEMORY MODULES HAVING MEMORY CONTROLLERS

(71) Applicant: Intel Corporation, Santa Clara, CA (US)

(72) Inventors: Vinodh Gopal, Westborough, MA (US); Gilbert M. Wolrich, Framingham, MA (US); Kirk S. Yap, Westborough, MA (US)

(73) Assignee: Intel Corporation, Santa Clara, CA (US)

( * ) Notice: Subject to any disclaimer, the term of this patent is extended or adjusted under 35 U.S.C. 154(b) by 60 days.

(21) Appl. No.: 14/865,675

(22) Filed: Sep. 25, 2015

(65) Prior Publication Data

US 2017/0091120 A1   Mar. 30, 2017

(51) Int. Cl.
*G06F 21/00*   (2013.01)
*G06F 12/14*   (2006.01)
*G06F 11/32*   (2006.01)
*G06F 11/16*   (2006.01)
*G06F 13/00*   (2006.01)

(52) U.S. Cl.
CPC ...... *G06F 12/1408* (2013.01); *G06F 11/1608* (2013.01); *G06F 11/327* (2013.01); *G06F 13/00* (2013.01); *G06F 2212/1052* (2013.01)

(58) Field of Classification Search
CPC .................................................. G06F 12/1408
USPC ......................................................... 713/193
See application file for complete search history.

(56) References Cited

U.S. PATENT DOCUMENTS

| | | | |
|---|---|---|---|
| 6,651,171 B1 * | 11/2003 | England | G06F 12/1491 711/163 |
| 2007/0180186 A1 * | 8/2007 | Cornwell | G06F 12/023 711/103 |
| 2013/0054896 A1 * | 2/2013 | Colavin | G06F 12/084 711/118 |
| 2015/0220455 A1 * | 8/2015 | Chen | G06F 12/1408 711/163 |
| 2016/0328282 A1 * | 11/2016 | Rogati | G06F 11/0772 |

* cited by examiner

*Primary Examiner* — Alexander Lagor
*Assistant Examiner* — Syed M Ahsan
(74) *Attorney, Agent, or Firm* — Trop Pruner & Hu, P.C.

(57) ABSTRACT

A host central processing unit subsystem that writes information to external memory may provide policy to the external memory. Then every time a write comes from the host subsystem, a memory controller within the memory may check the write against the policy stored in the memory and decide whether or not to implement the write.

24 Claims, 2 Drawing Sheets

SECURING WRITES TO MEMORY MODULES HAVING MEMORY CONTROLLERS

BACKGROUND

This relates generally to storing information in memories and computers.

Conventionally, some memory types such as dual inline memory modules (DIMM) have no way to monitor the information being written into them. Thus, malicious code may be written into these memories, unknown to the internal memory controller.

Typically control over the types of data written is the responsibility of the host computer system that writes to the memory. But the host computer system generally implements writes through code driven by the operating system and applications thereon. These applications themselves may enable any check system to be overridden by malicious code.

As a result, memories generally have no protection against the storage of malicious code by the host computer system that may subsequently be used for various malicious activities.

BRIEF DESCRIPTION OF THE DRAWINGS

Some embodiments are described with respect to the following figures.

DETAILED DESCRIPTION

Figure 1:
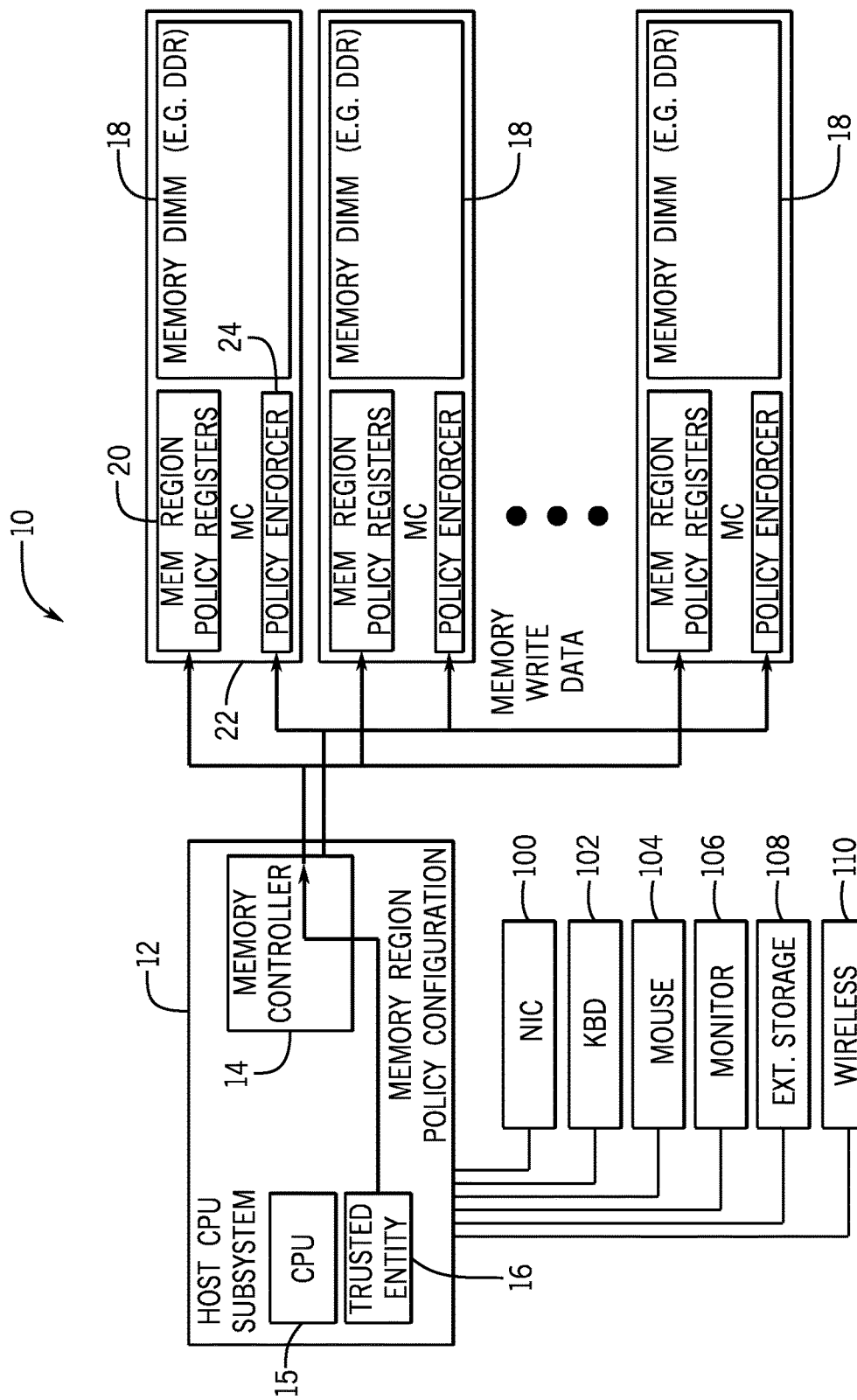
FIG. 1 is a schematic depiction for one embodiment.

In accordance with some embodiments, enforcement of policies against writing certain types of data and code to memories, such as dual inline memory modules, may be enforced by a memory controller within the dual inline memory module or other memory. Generally these controllers are not easily accessed by malicious code. Moreover, the policies that are stored within the memory controller for the enforcement of write policies may be provided during boot from a trusted entity within the host computer system.

A host central processing subsystem may include one or more central processing units that address external integrated circuit memory. Examples include personal computers, game consoles, e-book readers, set top boxes and cellular telephones.

At host system initialization, all processing units that have access to a memory channel and the memory channel itself communicate securely. The processing units send a set of memory address regions with special storage policies to the memory controller. This information about storage policies is stored inside the memory controller or in the memory itself. The storage policy may be based on a particular characteristic of the data to be stored including the fact the data values are in a particular sequence (i.e. sequential or monotonic), that the data values are of a specific type (e.g. alphabetical or numerical or floating point or credit card format). Thus, in some embodiments what is checked is a particular characteristic of the data to be stored.

During normal operation, the memory controller snoops (watches) every write transaction to determine if it addresses a specified memory address region in a list maintained in the controller. Then the controller checks whether a data value being written to a particular memory region conforms to the policy set for that region. There can be overlapping memory regions and multiple properties or data values associated with a specific memory region.

Checking the new data value can be done independently of any other values or state. However, in other embodiments, the checking of the new data value may be based on previous or nearby stored values. For example, that check may determine whether a data value is part of monotonic sequence with respect to one or more previously stored values. The monotomic sequence may be increasing or decreasing.

If the data value is determined to be offending, because it conflicts with the stored policy, then the write transaction may be aborted and a fault signal may be sent to the host.

In a simple architecture this may be done using a machine check architecture (MCA) error or using other hardware based error reporting mechanisms. Another variation is where the memory returns a set of values indicative of the nature of the data value being written. The set can be considered as error codes ordered from least severe to most fatal. Then the host Central Processing Unit (CPU) can determine how to proceed. The fault event driven by the error code may set the CPU back into a secure mode. For example, a virtual machine exit (VME) may occur to a trusted agent in a hypervisor. This trusted agent determines if the error code is non-fatal. Without using a trusted agent, the decision about what to do about the fault could be exploited or overridden by malicious host software. Another option is to support only fatal codes and then there is no way for malicious code to exploit the error handling decision process.

For processor chips with multiple central processing units and one or more dual inline memory interfaces, a policy may be applied and maintained at each dual inline memory module interface, depending on the system address map.

In many embodiments, the write policy is only applied to a particular address range within the overall memory. In other words, the address range to which the write policy applies may be, in many embodiments, less than the entire address range. Thus, there may be many write policies for one given external memory. There may be more than one write policy that applies to a particular memory location. In other words, each write policy may span a range of addresses and ranges of addresses may overlap so that different write policies may apply to the same specific memory locations.

Examples of other write policies may be applied include that the data values must be alphabetic or that the data values must be numeric. In addition, the data values may be specified as not including certain letters. Further, the write policy could require that a given value must start with a particular number or letter. Other examples include value range checks and format or data types combined with value range checks such as dates, credit card numbers, floating point ranges, etc.

Thus referring to FIG. 1, the host central processing unit subsystem 12 may include a trusted entity 16 such as a hypervisor. A hypervisor is a virtual machine monitor that creates and runs virtual machines. The host memory controller 14 receives a memory region policy configuration from the trusted entity typically at boot-up. The memory controller then sends this policy to all the connected memory modules such as dual inline memory modules 18.

Each memory module 18 may include a memory controller 22 and a region for storing the memory region policy configuration. It also may include a policy enforcer 24 to enforce the policy upon each write.

Then, when the memory controller 14 sends a write, it sends it to the policy enforcer which then enforces the policy against the subject matter or nature of the write as described previously. During the system initialization or boot, a trusted entity within the host central processing unit subsystem is responsible for securely providing data policies associated with the various memory address ranges. The trusted entity, which is responsible for the memory region policy configuration, may be a basic input/output system (BIOS), an operating system or a hypervisor, to mention a few examples. For example, when the system is booting, the basic input/output system, which recognizes the memory devices attached to the system, may enable and configure them accordingly. A trusted entity is an entity that consistently behaves in expected ways, enforced by software and hardware. For example, a trusted entity may involve a unique encryption key inaccessible by other entities.

Once the data policies have been established in the memory, the system is ready to process memory transactions. With each write transaction, the policy enforcer applies all policies valid for that region that the transaction is addressed to and examines the data in the device's memory controller. The transaction is accepted if it adheres to the preset policy. If there is a violation, then a fault may be signaled, for example as a fatal Machine Check Architecture (MCA) event or delivered to a secure mode of operation within the host subsystem that can determine whether the error is non-fatal.

Figure 2:
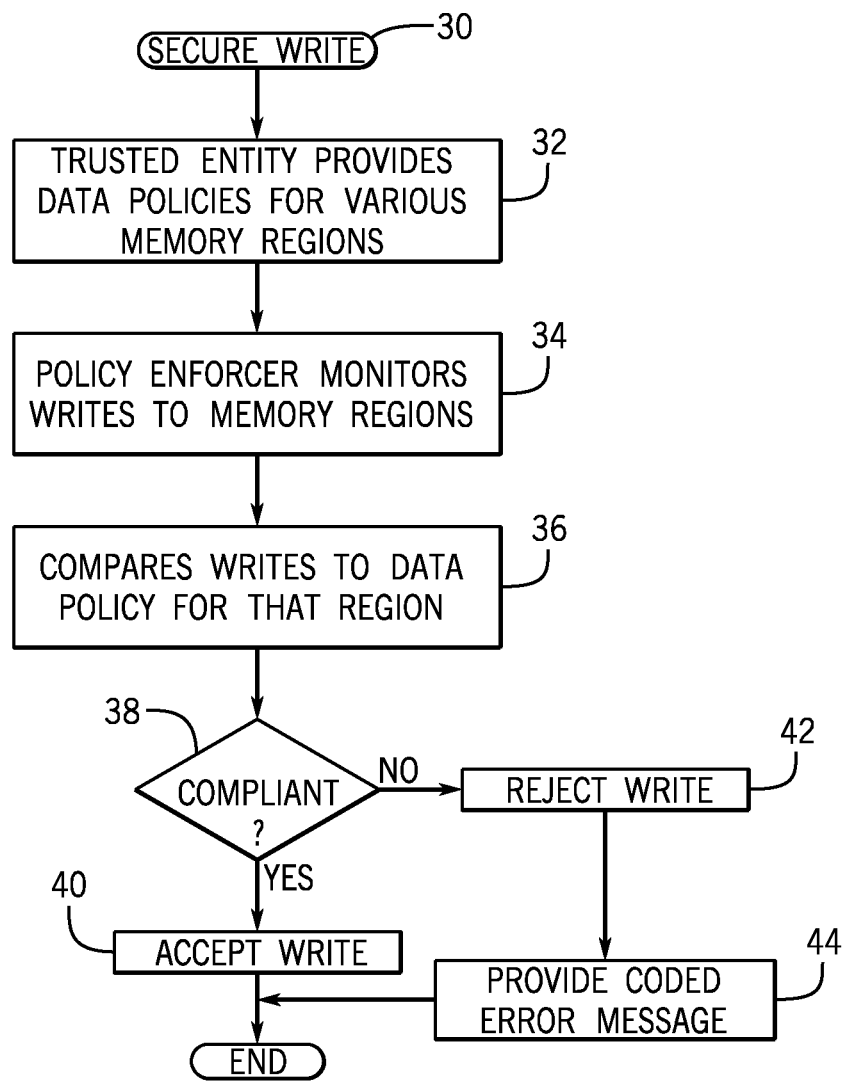
FIG. 2 is a flow chart for one embodiment.

Thus referring to FIG. 2, a sequence 30 may be implemented in software, firmware and/or hardware. In software and firmware embodiments it may be implemented by computer executed instructions stored in one or more non-transitory computer readable media such as magnetic, optical or semiconductor storages. In one embodiment it may be stored in the memory controller or in a memory controlled by that memory controller such as within a dual inline memory module.

The sequence 30 begins at block 32 when a trusted entity provides data policies for various memory regions to the various memories coupled to a host system such as dual inline memory modules.

Then, within each memory module, a policy enforcer monitors writes to memory regions as indicated in block 34. The policy enforcer compares write data to data policies for that region as indicated in block 36. If the write data violates the policy as determined in diamond 38, then the write is rejected as indicated in block 42. In some embodiments, an error code may be provided as indicated in block 44. Otherwise, the write is accepted as indicated in block 40.

As one example, counter mode encryption may be implemented in such a system. Countermode encryption is a high performance mode of encryption that suffers from issues of security in event that a counter is not properly used. A proper use is defined as never reusing a counter for a given key. Rather than relying on software to enforce and check this behavior, a region of memory can be created to hold a number of counter values.

The memory dual inline memory module controller is then informed about this region containing for example, 1000 counters, each of which is 64-bits in size in one embodiment. The policy to be enforced may be whether the data is monotonically increasing. Thus, each value can be compared to the previously stored value and the new value accepted only if the new is greater than the old. This policy will also ensure that the counter never overflows or wraps around and saturates at 0xFF . . . FF.

These types of monotonic data properties can also be used for other secure schemes for example to help prevent reply/roll-back attacks by storing time-stamps, sequence numbers, transaction numbers and so forth.

The memory units may be memory modules that include an integrated circuit with an on-board memory controller. Other memory modules useful in some embodiments include TransFlash memory modules, single in-line pin package memory, and single in-line memory modules (SIMM). The memory can be any suitable volatile memory such as Joint Electronic Device Engineering Council (JEDEC) standards based memories including one or more of DDR3 (dual data rate version 3, original release by JEDEC on Jun. 27, 2007, currently on release 21), DDR4 (DDR version 4, initial specification published in September 2012 by JEDEC), LPDDR3 (low power DDR version 3, JESD209-3B, August 2013 by JEDEC), LPDDR4 (LOW POWER DOUBLE DATA RATE (LPDDR) version 4, JESD209-4, originally published by JEDEC in August 2014), WIO2 (Wide I/O 2 (WideIO2), JESD229-2, originally published by JEDEC in August 2014), HBM (HIGH BANDWIDTH MEMORY DRAM, JESD235, originally published by JEDEC in October 2013), DDR5 (DDR version 5, currently in discussion by JEDEC), LPDDR5 (currently in discussion by JEDEC), WIO3 (Wide I/O 3, currently in discussion by JEDEC), HBM2 (HBM version 2), currently in discussion by JEDEC), and/or others, and technologies based on derivatives or extensions of such.

The memory can be a non-volatile memory such as, Multi-Level Cell (MLC)/Single Level Cell (SLC)/Triple Level Cell (TLC) NAND flash memory, ferroelectric random-access memory (FeTRAM), nanowire-based non-volatile memory, three-dimensional (3D) crosspoint memory, phase change memory (PCM), memory that incorporates memristor technology, Magnetoresistive random-access memory (MRAM), Spin Transfer Torque (STT)-MRAM, and other electrically erasable programmable read only memory (EEPROM) type devices.

Communication (such as key exchange) between the host and the memory controller in the memory unit can happen as follows according to one embodiment. Higher layer protocols are sometimes employed on top of a bus protocol to perform non-user functionalities. For example, a DIMM employs a mailbox protocol on top of a double data rate (DDR) interface. This mailbox interface allows the host to communicate with the firmware of the memory controller. Some functions performed through the mailbox interface include but are not limited to configuration, debug, system management and security related tasks. The mechanism employed is as follows. A set of mailbox registers are defined and are used to facilitate communication between the host through the DDRx bus with the firmware (FW) running on the device microcontroller. They are memory mapped into a DIMM physical address space. The mailbox registers include a command register, a status register, and one or more payload registers. The Host optionally fills in possible input payload registers, writes an opcode to the command register than sets the doorbell. After the doorbell is set, the host polls the status register for completion status. When completed, if command results in data being returned, the host reads the payload register in which the data is stored For example, in a Diffie-Hellman key exchange, the host and the device need to exchange each other's public key. The host can send its public key with a SEND_PUBLIC_KEY command and the corresponding public key in the payload registers. Similarly, the host can retrieve the device's public key with a GET_PUBLIC_KEY, wherein the device public key can be read from the payload registers upon completion of the command.

The host may include one or more microprocessors 15 coupled to the microcontroller 14, as shown in FIG. 1. In some embodiments, a host subsystem may be coupled to a network interface controller 100, a keyboard 102, a mouse 104, a display controller/monitor 106, an external storage 108 and a wireless interface 110, in one embodiment. The host CPU subsystem may be part of a SoC in one embodiment. The SoC may include a central processing unit and a graphics processing unit in one embodiment.

While an embodiment has been described wherein a secure channel available during initialization is used for policy configuration, other secure techniques may also be used at times other than system initialization. For example, a secure memory controller (e.g. hardware) may be used. Then new regions with new policies may be configured as needed without requiring a boot sequence.

In accordance with some embodiments, the policy enforcer may be maintained in a secure environment (e.g. integrated circuit memory controller) on the host subsystem instead of in the memory module.

The following clauses and/or examples pertain to further embodiments:

One example embodiment may be a method comprising storing a write policy in an external memory, and enabling a write to external memory from a host central processing unit subsystem to be checked using a memory controller of said memory and the policy stored in said memory. The method may also include wherein said write policy includes a specification of a monotonic sequence for an address range in said memory. The method may also include wherein said write policy is only applied to a specific address range within said memory that includes less than all of the addresses in said memory. The method may also include issuing an error if the write policy is violated. The method may also include encrypting said error message. The method may also include encoding the severity of the error in said memory. The method may also include using a trusted entity to provide the write policy. The method may also include transferring said write policy at initialization of the central processing unit subsystem. The method may also include using a basic input/output system to provide the write policy to the memory. The method may also include encrypting said write policy using counter mode encryption and comparing each value to be stored to a prior stored value.

Another example embodiment may be one or more non-transitory computer readable media storing instructions to perform a sequence comprising storing a write policy based on a characteristic data being stored, and enabling a write to external memory from a host central processing unit subsystem to be checked using the policy stored in said memory. The media may include further storing instructions to perform a sequence wherein said write policy includes a specification of a monotonic sequence for an address range in said memory and said policy is stored in said external memory. The media may include further storing instructions to perform a sequence wherein said write policy is only applied to a specific address range within said memory that includes less than all of the addresses in said memory. The media may include further storing instructions to perform a sequence including issuing an error if the write policy is violated. The media may include further storing instructions to perform a sequence including encrypting said error message. The media may include further storing instructions to perform a sequence including encoding the severity of the error in said memory. The media may include further storing instructions to perform a sequence including using a trusted entity to provide the write policy. The media may include further storing instructions to perform a sequence including transferring said write policy at initialization of the central processing unit subsystem. The media may include further storing instructions to perform a sequence including using a basic input/output system to provide the write policy to the memory. The media may include further storing instructions to perform a sequence including encrypting said write policy using counter mode encryption and comparing each value to be stored to a prior stored value.

In another example embodiment may be an apparatus comprising an external memory and a processor to store a write policy based on a characteristic of data being stored and enable a write to the external memory from a host central processing unit subsystem to be checked using the policy stored in said external memory, said policy included. The apparatus may include wherein said write policy includes a specification of a monotonic sequence for an address range in said memory. The apparatus may include wherein said write policy is only applied to a specific address range within said memory that includes less than all of the addresses in said memory. The apparatus may include said memory controller to issue an error if the write policy is violated. The apparatus may include said memory controller to encrypt said error message. The apparatus may include said memory controller to encode the severity of the error in said memory. The apparatus may include said processor to use a trusted entity to provide the write policy. The apparatus may include said processor to transfer said write policy at initialization of the central processing unit subsystem. The apparatus may include said processor to use a basic input/output system to provide the write policy to the memory. The apparatus may include said processor to encrypt said write policy using counter mode encryption and comparing each value to be stored to a prior stored value.

References throughout this specification to "one embodiment" or "an embodiment" mean that a particular feature, structure, or characteristic described in connection with the embodiment is included in at least one implementation encompassed within the present disclosure. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While a limited number of embodiments have been described, those skilled in the art will appreciate numerous modifications and variations therefrom. It is intended that the appended claims cover all such modifications and variations as fall within the true spirit and scope of this disclosure.

What is claimed is:
1. A method comprising:
    storing a write policy in an external memory, said write policy based on a characteristic of data to be stored;
    enabling a write to the external memory from a first integrated circuit including a host central processing unit subsystem to be checked using a memory controller of said external memory and the policy stored in said external memory, said external memory and said memory controller being part of a second separate integrated circuit not part of said first integrated circuit, including enabling said memory controller on said second integrated circuit to analyze data to be written to determine whether the data has the characteristic identified in said write policy;

and encrypting said write policy using counter mode encryption and comparing each value to be stored to a prior stored value.

2. The method of claim 1 wherein said write policy includes a specification of a monotonic sequence for an address range in said memory.

3. The method of claim 1 wherein said write policy is only applied to a specific address range within said memory that includes less than all of the addresses in said memory.

4. The method of claim 1 including issuing an error if the write policy is violated.

5. The method of claim 4 including encrypting said error message.

6. The method of claim 1 including using a trusted entity to provide the write policy.

7. The method of claim 1 including transferring said write policy at initialization of the central processing unit subsystem.

8. The method of claim 7 including using a basic input/output system to provide the write policy to the memory.

9. One or more non-transitory computer readable media storing instructions to perform a sequence comprising:

storing a write policy based on a characteristic of data being stored, said write policy based on a characteristic of data to be stored;

enabling a write to the external memory from a first integrated circuit including a host central processing unit subsystem to be checked using the policy stored in said external memory, said external memory and said memory controller being part of a second separate integrated circuit not part of said first integrated circuit, including enabling said memory controller on said second integrated circuit to analyze data to be written to determine whether the data has the characteristic identified in said write policy; and encrypting said write policy using counter mode encryption and comparing each value to be stored to a prior stored value.

10. The media of claim 9, further storing instructions to perform a sequence wherein said write policy includes a specification of a monotonic sequence for an address range in said memory and said policy is stored in said external memory.

11. The media of claim 9, further storing instructions to perform a sequence wherein said write policy is only applied to a specific address range within said memory that includes less than all of the addresses in said memory.

12. The media of claim 9, further storing instructions to perform a sequence including issuing an error if the write policy is violated.

13. The media of claim 12, further storing instructions to perform a sequence including encrypting said error message.

14. The media of claim 9, further storing instructions to perform a sequence including using a trusted entity to provide the write policy.

15. The media of claim 9, further storing instructions to perform a sequence including transferring said write policy at initialization of the central processing unit subsystem.

16. The media of claim 15, further storing instructions to perform a sequence including using a basic input/output system to provide the write policy to the memory.

17. An apparatus comprising:

an external memory on a first integrated circuit, said memory including a memory controller on said first integrated circuit;

a processor to store a write policy in the external memory, said write policy based on a characteristic of data to be stored, and enable a write to the external memory from a host central processing unit subsystem to be checked using the memory controller of said external memory and the policy stored in said external memory, said processor being part of a second separate integrated circuit not part of said first integrated circuit, said memory controller on said second integrated circuit to analyze data to be written by said host central processing unit subsystem to determine whether the data has the characteristic identified in said write policy, and encrypt said write policy using counter mode encryption and comparing each value to be stored to a prior stored value.

18. The apparatus of claim 17 wherein said write policy includes a specification of a monotonic sequence for an address range in said memory.

19. The apparatus of claim 17 wherein said write policy is only applied to a specific address range within said memory that includes less than all of the addresses in said memory.

20. The apparatus of claim 17, said memory controller to issue an error if the write policy is violated.

21. The apparatus of claim 20, said memory controller to encrypt said error message.

22. The apparatus of claim 17, said processor to use a trusted entity to provide the write policy.

23. The apparatus of claim 17, said processor to transfer said write policy at initialization of the central processing unit subsystem.

24. The apparatus of claim 23, said processor to use a basic input/output system to provide the write policy to the memory.

* * * * *